Patented July 25, 1933

1,919,851

UNITED STATES PATENT OFFICE

EMIL LÜSCHER, OF BASEL, SWITZERLAND, ASSIGNOR TO LONZA ELEKTRIZITATSWERKE UND CHEMISCHE FABRIKEN AKTIENGESELLSCHAFT, OF GAMPEL AND BASEL, SWITZERLAND

MANUFACTURE OF FORMIC ACID FROM FORMATES

No Drawing. Application filed July 27, 1931, Serial No. 553,481, and in Switzerland August 10, 1930.

Hitherto the production of formic acid from formates was effected in practice exclusively by way of a double reaction of formates, particularly of sodium formate, with sulphuric acid.

Now, it has been found that formic acid can be obtained from metal formates by means of nitric acid, if the reaction with diluted nitric acid is performed at low temperature, that is at a temperature not exceeding about 60° C. preferably at room temperature in presence of buffer or stabilizing substances, such as formates, urea or amines, and if the resulting formic acid is then separated by extraction or fractional distillation.

The effect of said buffer substances is illustrated by the following statement and generally consists in a stabilization for the purpose of restraining decomposition of formed formic acid by nitric acid.

A solution which contains 30% of calcium nitrate and 25% of formic acid, decomposes itself already at a temperature below the room temperature with intense gas development. At increased temperature, for example at 40–60° C. the decomposition takes place in a somewhat explosive manner. If, however, a small quantity of a buffer substance, for example urea, is added to the said solution in a proportion of 1%, such decomposition is scarcely perceptible at 60° C., the solution having thus been rendered stable by the addition of urea.

A similar stabilizing effect is produced by an addition of about 10% of calcium formate, further by an addition of about 2–5% of aniline or benzidine.

The following examples illustrate the present invention.

Example 1

312 gr. of calcium formate were stirred up with 438 gr. of water and mixed with 402 gr. of nitric acid of 62.7% strength at a temperature of 6–7° C. Under these conditions, about 83% of the present formate entered into reaction, whilst 17% thereof remained in solution to act as buffer substance. This solution showed no symptom of decomposition even when heated to 100° C. On subsequent distillation in vacuo formic acid was liberated in form of an acid of about 25% strength.

In a similar test with potassium formate, the greatest part of the potassium was separated out after addition of nitric acid in form of solid potassium nitrate.

Example 2

420 gr. of sodium formate were introduced at room temperature under good stirring into 478 gr. of nitric acid of 63% strength. From this solution, sodium nitrate separated out. 257 gr. of this sodium nitrate were filtered off. The filtrate contained 20.6% of sodium nitrate, 29.4% of free formic acid, 13.4% of sodium formate and 36.6% of water. This solution also was entirely stable on removing the formic acid by distillation.

In these examples, instead of using formates as buffer substances, there can also be used urea, aniline, tolidine, benzidine, etc.

What I claim is:—

1. A process for the manufacture of formic acid from metal formates, consisting in treating a metal formate with diluted nitric acid at a temperature not exceeding about 60° C. in presence of an organic stabilizer of the group consisting of formates, urea and amines, and separating then the resulting formic acid.

2. A process for the manufacture of formic acid from metal formates, consisting in treating a metal formate with diluted nitric acid at a temperature not exceeding about 60° C. in presence of an excess of metal formate and removing the resulting formic acid.

3. A process for the manufacture of formic acid from metal formates, consisting in treating a metal formate with diluted nitric acid at a temperature not exceeding about 60° C. in presence of urea and removing the resulting formic acid.

4. A process for the manufacture of formic acid from metal formates, consisting in treating a metal formate with diluted nitric acid at a temperature not exceeding about 60° C. in presence of an amine and removing the resulting formic acid.

5. A process for the manufacture of formic acid from metal formates, consisting in treating a metal formate with diluted nitric acid at a temperature not exceeding about 60° C. in presence of an organic stabilizer of the group consisting of formates, urea and amines, and separating then the resulting formic acid by distillation.

EMIL LÜSCHER.